Figure 1:
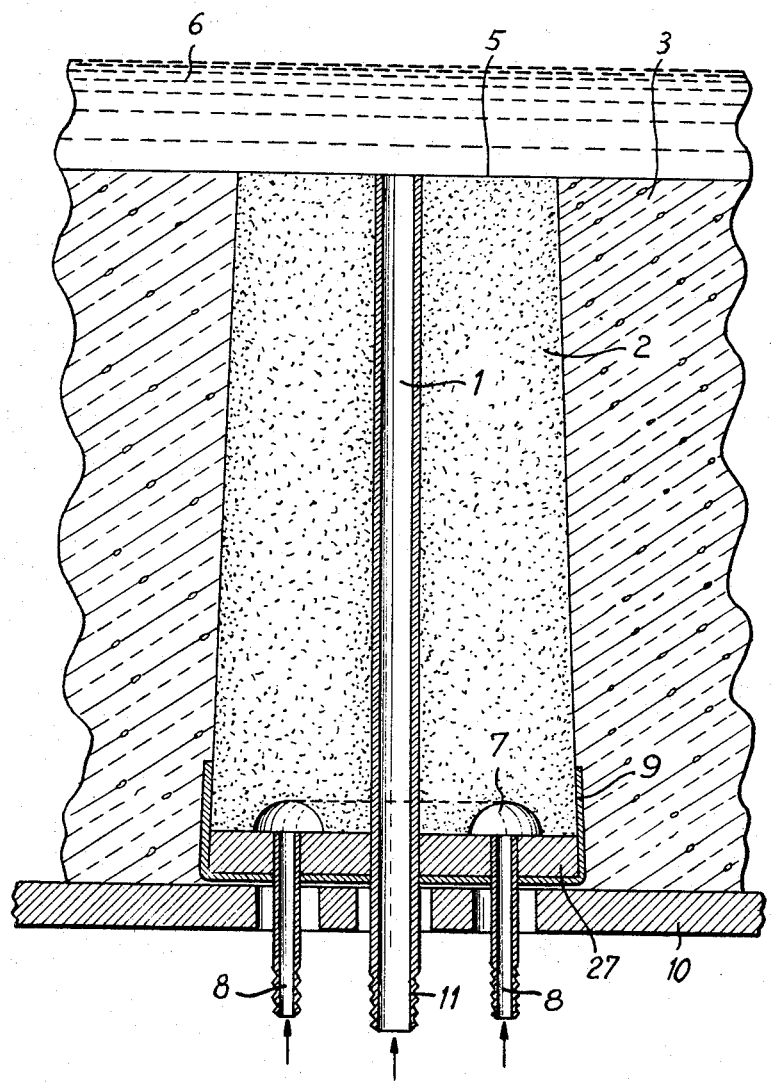

July 11, 1967 E. DE MOUSTIER ETAL 3,330,645
METHOD AND ARTICLE FOR THE INJECTION OF FLUIDS
INTO HOT MOLTEN METAL
Filed July 30, 1963 4 Sheets-Sheet 1

APPLICANTS
Edouard de Moustier and
Jean Perreau
BY
Misegades & Douglas
ATTORNEYS

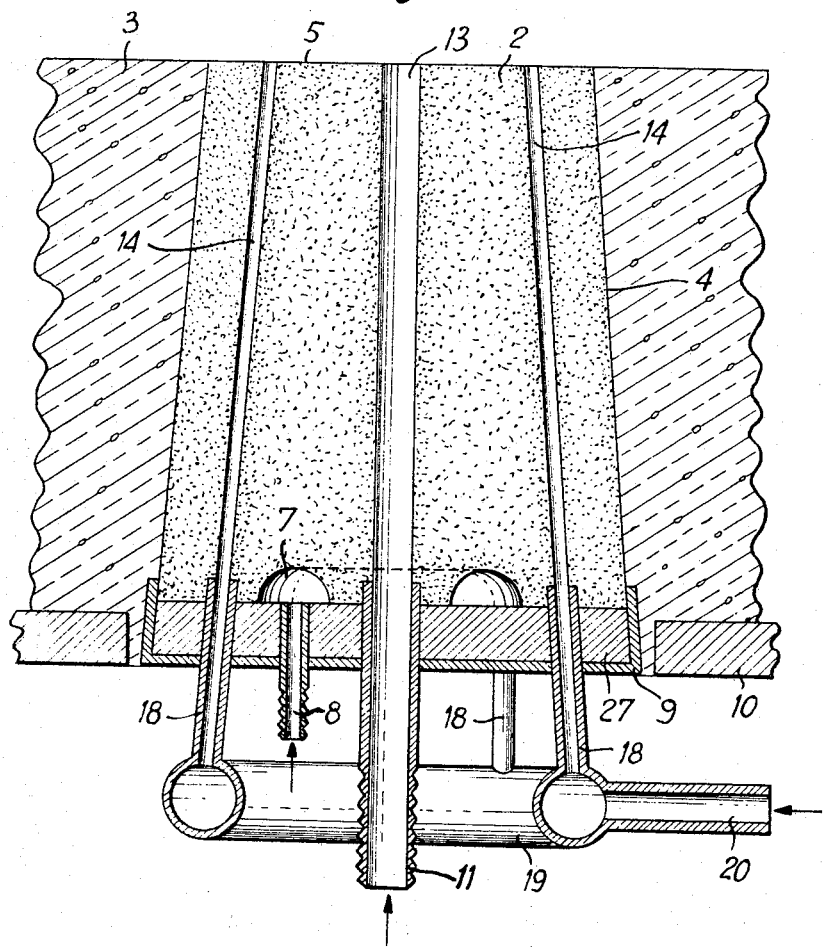
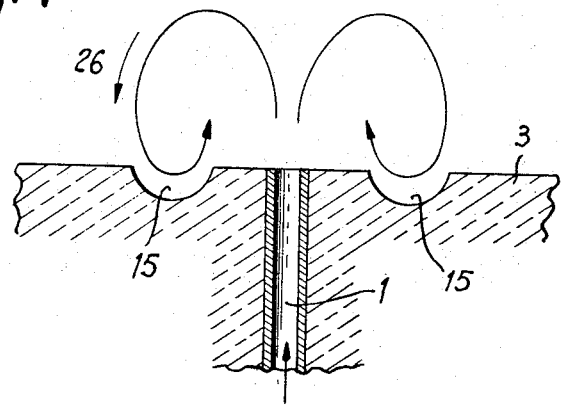

United States Patent Office 3,330,645
Patented July 11, 1967

3,330,645
METHOD AND ARTICLE FOR THE INJECTION OF FLUIDS INTO HOT MOLTEN METAL
Edouard de Moustier, Vernou Guadeloupe, French West Indies, and Jean Perreau, Neuilly-sur-Seine, France, assignors to L'Air Liquide, Societe Anonyme pour l'Etude et l'Exploitation des Procedes Georges Claude
Filed July 30, 1963, Ser. No. 298,691
Claims priority, application France, Aug. 7, 1962, 906,327, Patent 1,347,014; Apr. 12, 1963, 931,382, Patent 1,361,541
8 Claims. (Cl. 75—60)

This invention relates to the injection of fluids into hot molten metal such as, more particularly, the injection of oxygen into molten iron in steel-making operations.

More generally, the invention provides an improvement to high-temperature devices of the class which comprises injectors, tuyeres and submerged burners hereinafter collectively referred to as "injectors," these various devices being designed for operation in contact with hot molten metal.

A typical example of such devices is an injector for blowing industrial oxygen into molten iron, from below the liquidus surface of the molten iron, so that the injector outlet is immersed in the molten iron. A known type of such an injector may be embedded in the refractory lining of a metallurgical vessel, below the level of the molten metal surface.

With this type of injector, it has been found that excessive erosion of the refractory lining is liable to occur in an annular zone around the injector outlet, at some distance from this outlet. A possible cause for this kind of erosion might be the mechanical effect of a stationary vortical flow of the molten metal induced by the injected gas stream, as shown in FIG. 4.

One object of the invention is to provide a method for preventing this type of erosion of the refractory lining.

Another object of the invention is to provide for a metallurgical converter a novel type of tuyere bottom, which will be readily adaptable as a replacement unit for a conventional tuyere bottom, while making it possible to use industrially pure oxygen in the converter.

Yet another object of the invention is a novel method for blowing oxygen through permeable refractory material into molten iron in a steel-making operation, whereby the permeable refractory material may be better protected both against thermal and mechanical erosion. While further objects and advantages will become apparent from the subsequent description, it may be generally stated that the present invention consists in providing a permeable refractory sheath around an injection duct in a device of the kind considered, which is designed for operation in contact with hot molten metal, and in blowing a protective fluid through said permeable sheath into the molten metal.

An important feature is that the protective fluid is free to escape into the molten metal, so that the explosion hazards connected with the use of pressurized water cooling systems in the vicinity of hot molten metals are entirely avoided.

Cooling systems are already known, in which a coolant is caused to flow through porous material which forms, for instance, the wall of a rocket nozzle or a portion of the tip of a blast-furnace tuyere. Such devices do not, however, operate in contact with a dense and extremely hot liquid, such as molten steel. Molten metals being possibly up to 100,000 times heavier than hot combustion gases, have a much higher heat content per volume unit, so that entirely different problems arise.

One effect of the invention is that a protective layer of gas bubbles is formed and constantly renewed at the interface of the permeable refractory material with the molten metal. Experimental evidence shows that each new bubble remains attached to the porous material for some time before being released into the liquid metal. This explains how an insulating layer of gas bubbles may be maintained at the interface.

Figure 2:
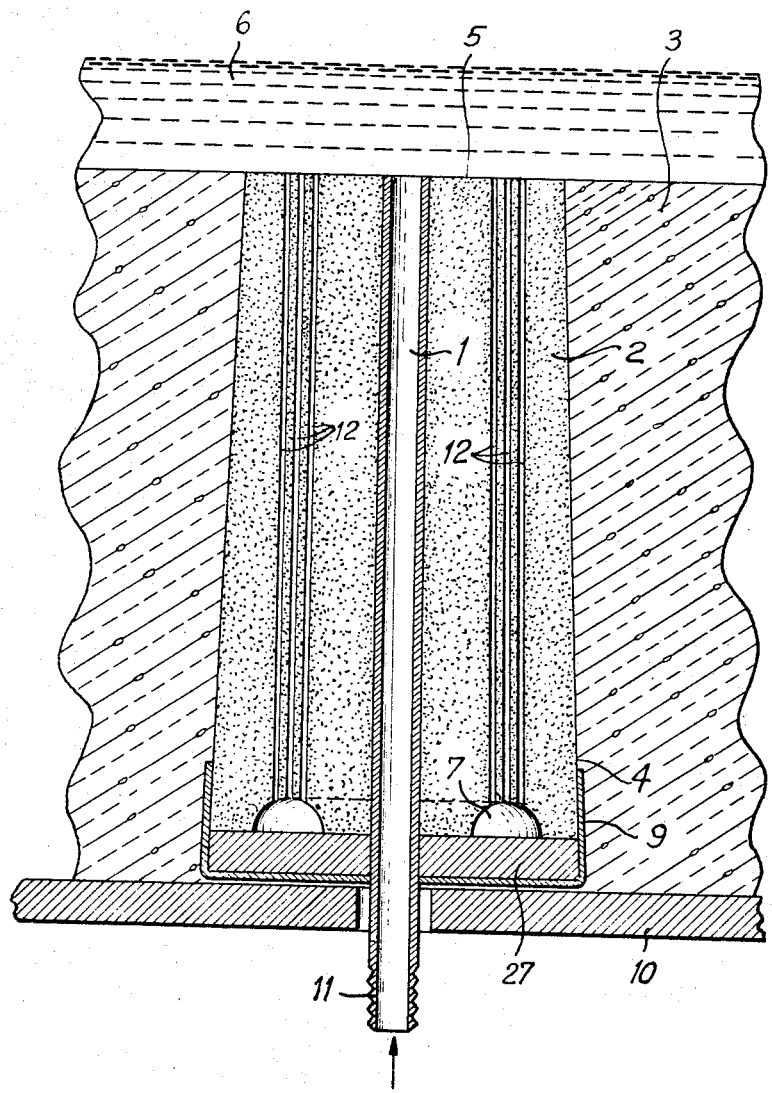
Figure 5:
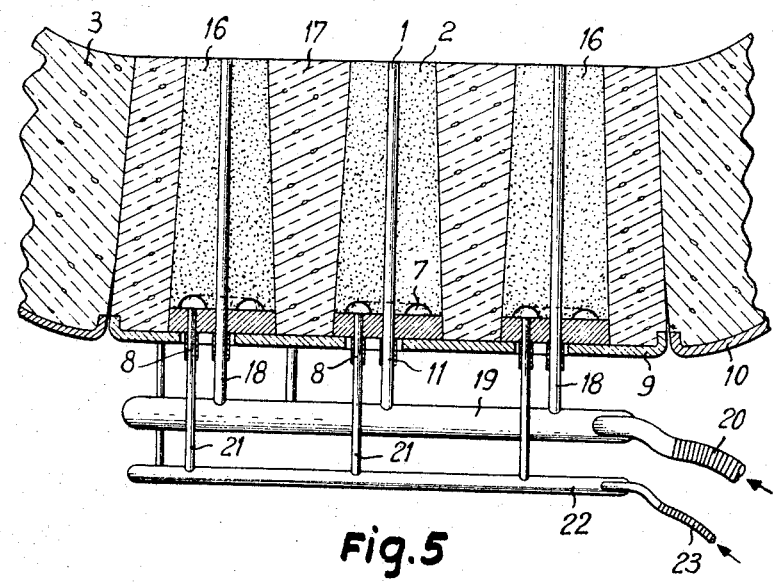
Figure 6:
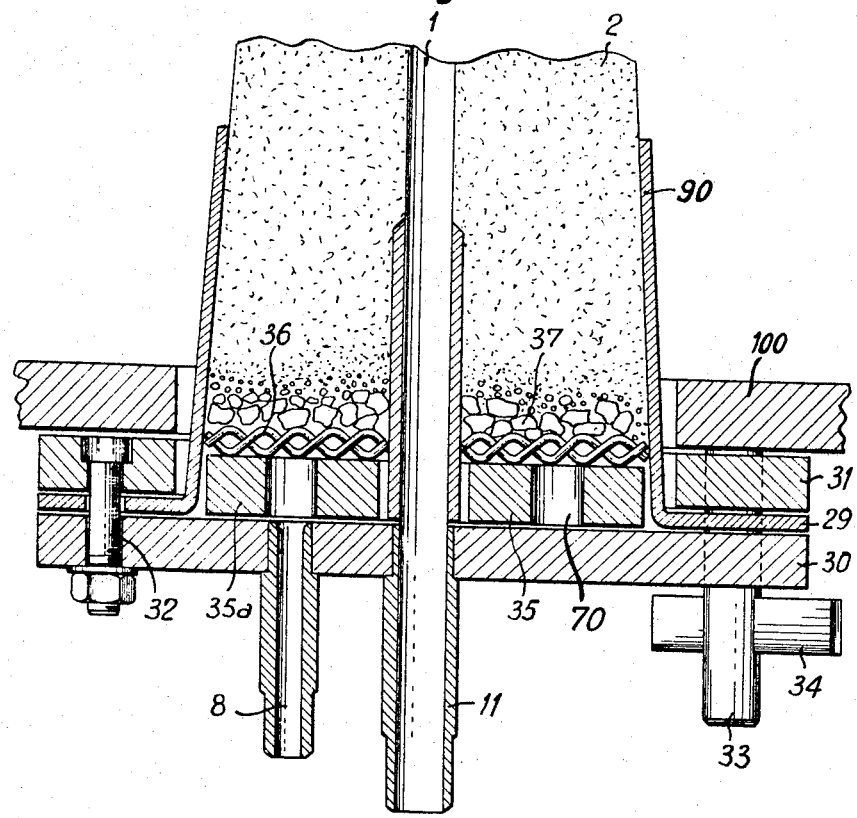

Further embodiments and features of the invention will be disclosed hereinafter in reference to the appended drawings in which:

FIG. 1 is a diagrammatic axial cross-sectional view of a sheathed injector with porous material according to the invention, FIG. 2 is a diagrammatic axial cross-sectional view of a sheathed injector with channels according to a modified construction of the invention, FIG. 3 is a diagrammatic axial cross-sectional view of a multiple injector assembly, FIG. 4 is an illustration of the erosion effects in prior injection systems, FIG. 5 is an axial cross-sectional view of a tuyere bottom for a converter, according to a further embodiment of the invention, FIG. 6 is a modified construction of the injector assembly of FIG. 1.

Where reference is made to a similar element of any of the several figures, a common reference numeral may be used for simplicity of description in order to correlate the construction into the operation and understanding of the invention.

Referring to FIGS. 1 and 2, a duct 1 is located along the axis of a frustro-conical block 2 of refractory material. Duct 1 may serve, for instance, for blowing oxygen into the bottom of a steelmaking converter. Through the block 2 are provided numerous fine channels giving passage to a cooling fluid. These channels may consist in a succession of open pores, as shown in FIG. 1, or in a series of discrete narrow bores 12, as shown in FIG. 2.

The refractory permeable block 2 of either embodiment of FIG. 1 or FIG. 2 is inserted in the refractory lining 3 of the converter, and is preferably sealed to this lining, in gas-tight manner, by a suitable refractory cement. The side wall of block 2 is coated with an impervious coating layer 4 particularly shown in FIGS. 2 and 3 which should prevent the cooling fluid injected into the block 2 from escaping through the side wall, and confine this fluid so that it will escape solely by the front face 5 of block 2, which is in contact with the molten metal 6.

The rear face of the porous block 2 is provided with an annular header groove 7 in registry with an inlet member 8 for the cooling fluid. Groove 7 is also in communication with the pores and channels 12 which extend through the porous block 2. The lower base of the block 2 may be provided with a jacket 9 of metal extending also over the lower portion of the side of the block. The block may rest on the bottom plate 10 of the converter shell through this jacket 9. Holes are provided in plate 10 for a threaded nipple 11 which forms the inlet to the central duct 1, and for nipples 8 forming an inlet for the cooling fluid. Nipples 8 may be assembled, as by welding, to a bottom plate 27 inserted at the bottom of jacket 9, so as to form the bottom wall of the annular chamber 7.

The cooling fluid injected through nipples 8 into the porous block may be of any suitable nature, such as water or steam, or carbon dioxide, or a mixture of steam with carbon dioxide. When the device is used as a submerged burner, a combustible gas such as hydrogen may be injected through the permeable block 2, while oxygen is injected through the central duct 1.

In steel-making operations, industrially pure oxygen may be injected through the pores of block 2, while a gas, such as air, is injected through nipple 11 into the central duct 1 for stirring the metal bath. This gas may be laden with comminuted solid material such as lime, which will increase the stirring effect, while filling the usual well-known metallurgical purposes of lime injection.

The device shown in FIG. 3 is particularly intended for this simultaneous injection of oxygen with a powder-laden stirring gas, the oxygen ducts 14 being slightly inclined toward the axis of block 2 so that the oxygen jets will converge together and meet the central jet of lime-carrying gas. A nipple 8 is again provided for injecting a coolant into the annular groove 7, and thence into the permeable refractory 2, similarly to the device of FIG. 1. Nipples 18 are provided for blowing oxygen through the oxygen ducts 14. They are connected to a ring-shaped header tube 19, provided with an inlet 20.

FIG. 4 shows how erosion tends to occur in an annular zone 15 around the outlet of an injection duct, in an unprotected injector. This erosion is probably caused by vortices 26 induced by the jet from duct 1. It is therefore desirable to inject the protective fluid preferentially through the portion of the refractory material which corresponds with the erosion affected annular zone 15, so as to minimize erosion.

FIG. 5 shows a tuyere bottom which comprises a plurality of injectors according to the invention. This tuyere may be readily adapted to an ordinary converter as a standard replacement unit for a conventional tuyere bottom.

It consists generally of several sheathed injectors 16, each of which may be similar or identical to the injector of FIG. 1. These injectors are embedded in a block 17 of refractory material, having the same shape and dimensions as a conventional tuyere bottom. The respective nipples 8 serving as coolant inlets to the injectors 16 are assembled to a ring-shaped header 22 through pipe stubs 21. A flexible hose 23 connects the coolant header 22 to a supply of coolant, not shown.

FIG. 6 shows how an injector according to FIGURE 1 or 2, or a converter bottom according to FIGURE 4, may be conveniently assembled with the shell 100 of a metallurgical vessel. The casing 90 of the injector assembly may be formed with an outwardly extending flange 29 which in turn may be clamped by bolts 32 between an assembly ring 31 and a closure plate 30 forming the bottom of the injector. The injector assembly may then be assembled to the shell 100 by studs 33, welded to shell 100, these studs being provided with keys 34 for locking the injector in tight assembly with the vessel shell 100.

The coolant header 70 may consist of an annular cavity formed between two concentrical washers 35 and 35a resting on the bottom plate 30. These washers may be covered with wire mesh 36, over which a layer of gravel 37 serves to divide the coolant flow into the permeable refractory mass 2.

The principles of this invention may also be put to use for injecting oxygen into molten iron through porous refractory material, which may form the entire bottom of a refining vessel, or of a refining channel, when the steel-making operation takes place in a continuous process using a channel.

The porous material may also form only a portion, or a plurality of portions, of the bottom wall of such a refining vessel or channel. According to the invention the porous material will be provided with zones of higher permeability through which a stirring gas will be blown into the molten metal. This stirring gas may be loaded with lime or other solid comminuted material, as indicated in the foregoing.

These features may further be combined with the injection of a coolant, through separate permeable portions of the refractory block.

While the method and apparatus of the invention have been more specifically described in their application to oxygen steel-making, mention should be made of their possible application in analogous fields, such as for instance, glass-making, where the principles of the invention may be readily applied to submerged burners for glass-making furnaces. Generally, the permeable refractory material for the practice of the invention may have a permeability of about 250 litres per second and per square mater, when measured with a gas having substantially the same viscosity as air.

One advantage of using such permeable material for the injection of oxygen through the bottom of a steel-making converter, is that the material is impervious to molten steel, so that the oxygen blast may be interrupted at the moment when oxidizable substances, such as silicon or aluminium, are to be added to the molten steel, while it will become easy to inject a neutral stirring gas which will help to disperse these alloying elements or deoxidizers in the molten steel.

What we claim is:

1. A method for preventing excessive localized erosion of the refractory lining of a metallurgical vessel provided with at least one duct for injecting a fluid into the molten metal contents of said vessel when erosion tends to occur more particularly in an annular zone around the outlet of said injection duct, which method comprises providing around said duct a lining with a large number of channels very substantially narrower than said duct, said channels extending across said lining into said zone which is liable to excessive local erosion, and blowing a protective fluid through said channels into the molten contents of said vessel.

2. An injector device for injecting a gas into a container of molten metal, comprising an injection duct for a first fluid extending through the wall of the container, a porous permeable refractory sheath around said duct and means for supplying a second fluid under presusre to said sheath whereby the second fluid permeates through the sheath and into the container.

3. A high-temperature injection device adapted for operating in contact with hot molten metal, particularly with molten ferrous metal, which comprises at least one injection duct provided with a permeable refractory sheath and means for blowing respectively a first fluid stream through said duct into molten metal in contact with said device and a second fluid stream through said sheath into said molten metal.

4. An injection drive according to claim 3, in which said permeable sheath is provided with an impervious coating over the periphery and the rear portion thereof, and with an inlet for said second fluid across said coating of the rear portion of said sheath, said coating being effective for confining said second stream within said sheath.

5. An injection device according to claim 3, in which the rear face of said permeable sheath is provided with an annular header groove in registry with an inlet for said second fluid and with a large number of fine channels extending across said sheath from said groove to the front face of said sheath, said front face being exposable to the molten metal.

6. As a new article of manufacture, a tuyere bottom for a metallurgical converter, said bottom comprising a refractory block having therein:
  (a) injection ducts for a first fluid,
  (b) permeable refractory sheaths around individual injection ducts and
  (c) means for respectively flowing a first fluid through said ducts and a second fluid through said sheaths into said converter,
said block being readily adaptable as a replacement unit for a conventional tuyere bottom in a converter.

7. A method of blowing industrial oxygen through permeable refractory material into molten iron for converting it to steel, which comprises providing in said refractory material zones of lower permeability and zones of higher permeability, blowing oxygen through said zones of lower permeability and blowing another fluid through said zones of higher permeability in an amount appropriate for stirring said molten iron.

8. A method according to claim 7, in which the zones of higher permeability comprise channels having sufficient width for giving passage to a suspension of comminuted solid materials in a gas.

References Cited

UNITED STATES PATENTS

| | | |
|---|---|---|
| 239,621 | 4/1881 | Pirath. |
| 1,763,248 | 6/1930 | Moore _____ 75—48 X |
| 2,203,778 | 6/1940 | Ditto _____ 75—60 |
| 2,871,008 | 1/1959 | Spire. |

BENJAMIN HENKIN, *Primary Examiner.*